US008134394B1

(12) United States Patent
Maxwell et al.

(10) Patent No.: US 8,134,394 B1
(45) Date of Patent: Mar. 13, 2012

(54) RF MICROWAVE CIRCUIT AND PULSE SHAPING METHOD

(75) Inventors: Erick Maxwell, Temple Terrace, FL (US); Thomas Weller, Tampa, FL (US); Ebenezer Odu, Tampa, FL (US)

(73) Assignee: University of South Florida, Tampa, FL (US)

( * ) Notice: Subject to any disclaimer, the term of this patent is extended or adjusted under 35 U.S.C. 154(b) by 266 days.

(21) Appl. No.: 12/406,681

(22) Filed: Mar. 18, 2009

Related U.S. Application Data

(60) Provisional application No. 61/037,484, filed on Mar. 18, 2008.

(51) Int. Cl.
*H03K 3/84* (2006.01)
(52) U.S. Cl. .................. 327/164; 327/291; 375/130
(58) Field of Classification Search .............. 327/18, 327/27, 164, 291; 375/130
See application file for complete search history.

(56) References Cited

U.S. PATENT DOCUMENTS

| 5,517,198 | A | * | 5/1996 | McEwan | 342/89 |
| 2007/0237208 | A1 | | 10/2007 | Maxwell et al. | |

OTHER PUBLICATIONS

Barr, A.W. 1993. Analyzing Crosstalk and Ground Bounce in Multiconductor Systems Using SPICE Circuit Simulations. AMP Journal of Technology. vol. 3: 10-20.
Maxwell, E.; Weller, T.; Harrow, J. 2006. A Tunable Ultra-Wideband Pulse Generator Using a Variable Edge-Rate Signal. Circuits and Systems. IEEE Asia Pacific Conference on Dec. 4-7, 2006. pp. 1695-1698.
Chen, C.; Vaidyanathan, P.P. 2005. IIR Ultra-Wideband Pulse Shaper Design. Conference Record of the Thirty-Ninth Asilomar Conference on Signals, Systems and Computers, 2005.
Han, J.; Nguyen, C. 2002. A New Ultra-Wideband, Ultra-Short Monocycle Pulse Generator with Reduced Ringing. IEEE Microwave and Wireless Components Letters. vol. 12, No. 6: 206-208.
Tan, A.E.; Chia, M.Y.; Leong, S. 2006. Sub-Nanosecond Pulse-Forming Network on SiGe BiCMOS for UWB Communications. IEEE Transactions on Microwave Theory and Techniques. vol. 54, No. 3: 1019-1024.
Mollfulleda, A.; Miskovsky, P.; Mateu, J. 2005. Robust Passive Shaping Network for Impulse Radio and UWB signal Generator. Microwave Symposium Digest, 2005 IEEE MTT-S International. 1339-1342.
Afshari, E.; Hajimiri, A. 2005. Nonlinear Transmission Lines for Pulse Shaping in Silicon. IEEE Journal of Solid-State Circuits. vol. 40, No. 3: 744-752.

(Continued)

*Primary Examiner* — Lincoln Donovan
*Assistant Examiner* — John Poos
(74) *Attorney, Agent, or Firm* — Wanhua Zhao; Courtney Dunn; Smith & Hopen, P.A.

(57) ABSTRACT

A multi-port circuit and corresponding method for simultaneous shaping of sub-nanosecond pulses ($MCS^3P$). The $MCS^3P$ includes a coupled-line coupler, a Schottky detector diode, and circuitry for compressing the rising and falling edges of a waveform. The $MCS^3P$ simultaneously produces square wave, Gaussian, and monocycle waveforms by differentiating a sinusoidal source. The method includes the steps of compressing the rising edge of a sinusoidal source waveform, differentiating the resulting waveform to form a square waveform and a Gaussian waveform, filtering out the positive going Gaussian to produce a negative going Gaussian, differentiating the Gaussian waveform to form a monocycle waveform, and compressing the falling edge of the square waveform to produce a square wave form with both edges compressed.

8 Claims, 20 Drawing Sheets

OTHER PUBLICATIONS

Maxwell, E.; Weller, T.; Harrow-James, J. 2006. A Variable Edge-Rate Compression Approach to Tunable Ultra-Wideband Pulse Generation. Proceedings of the 36th European Radar Conference, Sep. 13-15, Manchester: European Microwave Association, pp. 198-201.

Hu, B.; Beaulieu, N.C. 2004. Pulse Shaping in UWB Communication Systems. Vehicular Technology Conference, 2004. VTC2004-Fall. vol. 7: 5175-5179.

Fontana, R.J. 2004. Recent system applications of short-pulse ultra-wideband (UWB) technology. IEEE Transactions on Microwave Theory and Techniques. vol. 52, Issue 9: 2087-2104.

Radio Frequency Devices. Federal Communications Commission, Code of Federal Regulation, Title 47, ch. 1, part 15. Sub-Part F, Ultra-Wideband Operation. Sec. 503, 767-768. 2003.

Han, J.; Nguyen, C. Microstrip Impulse Generators with Tunable Pulse Duration for Ultra-Wideband Application. Asia Pacific Microwave Conference, Seoul, Korea, Nov. 2003.

Han, J.; Nguyen, C. 2004. Ultra-Wideband Electronically Tunable Pulse Generators. IEEE Microwave and Wireless Components Letter. vol. 14, No. 3.

Hsue, C.; Cheng, T.; Chen, H. 2003. A second-order microwave differentiator. IEEE Microwave and Wireless Components Letter. vol. 12, No. 3.

Ciamulski, T.; Gwarek, W.K. 2004. On Eliminating Crosstalk Within Multiconductor Transmission Lines. IEEE Microwave and Wireless Components Letters. vol. 14, No. 6: 298-300.

\* cited by examiner

RF MICROWAVE CIRCUIT AND PULSE SHAPING METHOD

CROSS REFERENCE TO RELATED APPLICATION

This application claims priority to pending U.S. Provisional Patent Application No. 61/037,484, filed on Mar. 18, 2008, the contents of which are herein incorporated by reference.

STATEMENT OF GOVERNMENT SUPPORT

This invention was made with Government support under Grant No. DGE-0221681 awarded by the National Science Foundation. The Government has certain rights in the invention.

FIELD OF INVENTION

This invention relates to ultra-wideband waveform pulse formation; more specifically, the simultaneous shaping of sub-nanosecond ultra-wideband waveform pulses.

BACKGROUND OF THE INVENTION

Ultra-Wideband (UWB) is a technology for transmitting information spread over a large bandwidth. UWB microwave systems are finding application in the form of impulse radio, as well as respiratory, cardiovascular and other sensing/monitoring applications. The Federal Communication Commission (FCC) defines UWB as an intentional radiator with an instantaneous 10 dB-fractional and total bandwidth of at least 0.2 and 500 MHz, respectively. This bandwidth is achieved primarily by radiating ultra short pulses that are derived from a basic Gaussian pulse shape. The FCC requires a magnitude response that varies between 0 dB and −23 dB within a 0.5 GHz to 3.5 GHz band. To maximize the energy within this band, pulse shaping is required. This shaping is achieved by differentiating or shaping the Gaussian pulse.

Solid-state UWB pulse shaping has been achieved using Gallium Arsenide (GaAs) Metal-Semiconductor Field-Effect Transistors (MESFETs), non-linear transmission lines, short-circuit stubs, and resistive-reactive circuits. In these applications, the waveform response to circuit reactance is fundamental to pulse formation. As such, the reactive elements form a simple resistor-capacitor (RC) or resistor-inductor (RL) network. In an RC network, waveform differentiation occurs in a process of charging and discharging the circuit capacitance. The capacitor builds up charge in accordance with the RC time constant ($\tau_{rc}$ where $\tau_{rc}$=RC), which defines the time required for a signal to rise to 63.2% of its full value. When used in conjunction with a 50Ω load, the RC time constant requires less than a 20 pF capacitance (C) for shaping sub-nanosecond pulses.

Accordingly, what is needed in the art is a system and method for improved simultaneous shaping of sub-nanosecond UWB waveform pulses.

SUMMARY OF THE INVENTION

The present invention provides a novel technique for the simultaneous shaping of sub-nanosecond ultra-wideband (UWB) waveform pulses.

A multi-port UWB pulse shaping circuit is provided. In an embodiment of the present invention, the pulse shaping circuit comprises an input port to receive a periodic input pulse, a first transmission line coupled to the input port to form and transmit a square wave pulse with sub-nanosecond edge rates from the periodic input pulse, a second and third transmission line positioned in a parallel coupled-line structure to the first transmission line to differentiate the square wave pulse form bipolar Gaussian pulses, and a first output port to output the square wave pulse. The pulse shaping circuit further comprises a clamping and filter circuit coupled to the second transmission line to clamp the positive amplitude portion of the bipolar Gaussian pulse and pass the negative amplitude portion of the bipolar Gaussian pulse, a second output port for outputting the negative amplitude Gaussian pulse, a Schottky detector differentiator coupled to the third transmission line to differentiate the Gaussian pulse to form a monocycle pulse, and a third output port to output the monocycle pulse. The input pulse may be a sinusoidal pulse.

In an additional embodiment, the pulse shaping circuit further comprises two step-recovery diodes, one coupled to the input port and the first transmission line to compress the rising edge of the input pulse and another coupled to the first transmission line and the first output port to compress the falling edge of the square pulse.

In an embodiment of the present invention, the pulse shaping circuit comprises circuitry for compressing the rising edge of an input pulse, a coupled-line differentiator coupled to the rising edge compressing circuitry to differentiate the input pulse to form a square wave pulse and a Gaussian pulse, circuitry for compressing the falling edge of the square wave pulse coupled to the coupled-line differentiator, and a Schottky detector differentiator coupled to the coupled-line differentiator to differentiate the Gaussian wave pulse to form a monocycle pulse. The input pulse may be a sinusoidal pulse.

In another embodiment, the pulse shaping circuit further comprises a clamping and filter circuit coupled to the coupled line differentiator to filter out the positive portion of the Gaussian wave pulse.

A method for simultaneously shaping sub-nanosecond pulses is provided. In an embodiment of the present invention, the method comprises receiving an input pulse, differentiating the input pulse to form a square wave pulse and a Gaussian pulse, and then differentiating the Gaussian pulse to form a monocycle pulse. The input pulse may be a sinusoidal pulse.

In an additional embodiment, the method further comprises compressing the rising and falling edges of the pulse.

In another embodiment, the method further comprises filtering out the positive amplitude portion of the Gaussian pulse.

In a further embodiment, the method further comprises outputting the square wave pulse, the negative amplitude portion of the Gaussian pulse, and the monocycle pulse.

BRIEF DESCRIPTION OF THE DRAWINGS

For a fuller understanding of the invention, reference should be made to the following detailed description, taken in connection with the accompanying drawings, in which.

DETAILED DESCRIPTION OF THE PREFERRED EMBODIMENT

In the following detailed description of the preferred embodiments, reference is made to the accompanying drawings, which form a part hereof, and within which are shown by way of illustration specific embodiments by which the invention may be practiced. It is to be understood that other embodiments may be utilized and structural changes may be made without departing from the scope of the invention.

Figure 1:
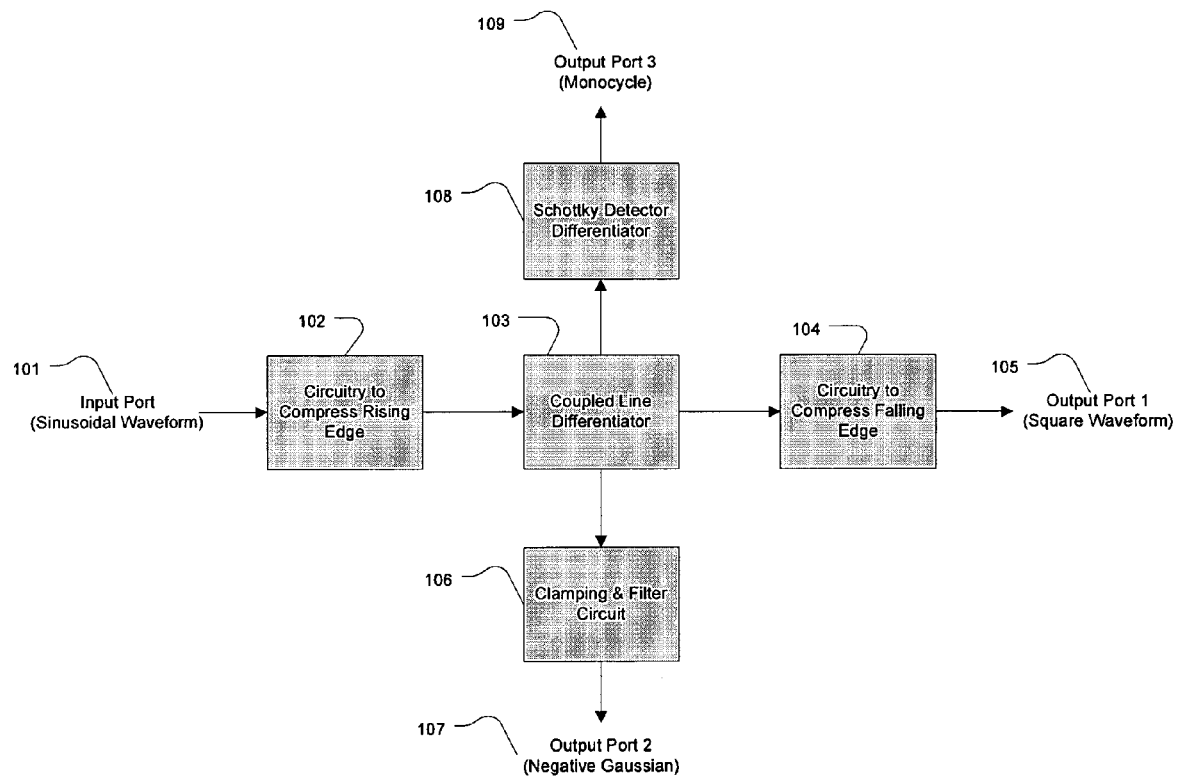
FIG. 1 is a simplified block diagram of the Multi-Port Circuit for Simultaneous Shaping of Sub-Nanosecond Pulses (MCS³P) in accordance with an embodiment of the present invention.

Ultra-wideband (UWB) waveform pulse shaping circuits have been implemented with Gallium Arsenide (GaAs) Metal-Semiconductor Field-Effect Transistors (MESFETs), non-linear transmission lines, short-circuit stubs, and resistive-reactive circuits. In an embodiment of the present invention, a coupled-line coupler and Schottky detector diode are utilized for UWB signal differentiation because their mutual and junction capacitances are small enough to accommodate shaping of sub-nanosecond pulses within a resistor-capacitor (RC) configuration. Through an application of Kirchhoff's current law, the mutual and junction capacitances in the coupler and diode, respectively, are shown to form an RC differentiator that promotes sub-nanosecond pulse shaping. These differentiators were implemented in a circuit which simultaneously produces square wave, Gaussian, and monocycle waveforms by using step recovery diodes to compress the edges of a 14 MHz sinusoidal source. The resulting pulse generator is called a multi-port circuit for simultaneous shaping of sub-nanosecond pulses ($MCS^3P$). A general diagram of the MCS3P is shown in FIG. 1 and will be described in greater detail below. Also disclosed herein is a method of shaping sub-nanosecond pulses simultaneously. First, separate descriptions of each of the coupled-line coupler differentiator and the Schottky detector differentiator and their use and application for UWB signal differentiation are disclosed.

UWB Coupled-Line Coupler Differentiator

The basis for UWB coupled-line differentiation originates from a combination of theories for analyzing crosstalk in multi-conductor transmission lines and transients in resistor-capacitor (RC) networks. Typically, crosstalk is treated as unwanted distortion or switching noise that result from lossy multi-conductor transmission lines. It is often discouraged in time-domain applications by increasing the distance between conductors, adding capacitance (decoupling capacitance) at the end of transmission lines, and limiting the number and length of parallel traces. However, controlled-transients are desirable in UWB coupled-line differentiation.

Figure 2A:
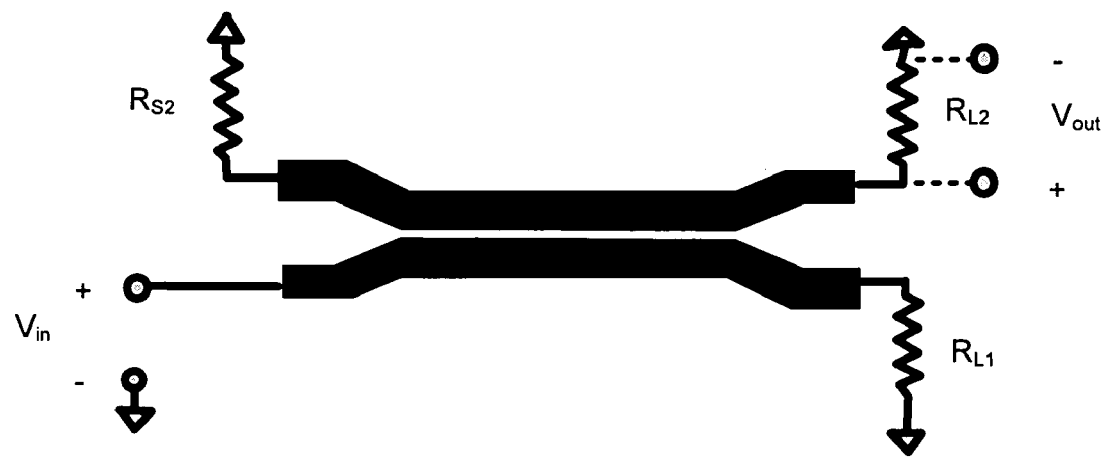
FIG. 2A is a schematic of a single section microstrip coupled-line coupler in accordance with an embodiment of the present invention.
Figure 2B:
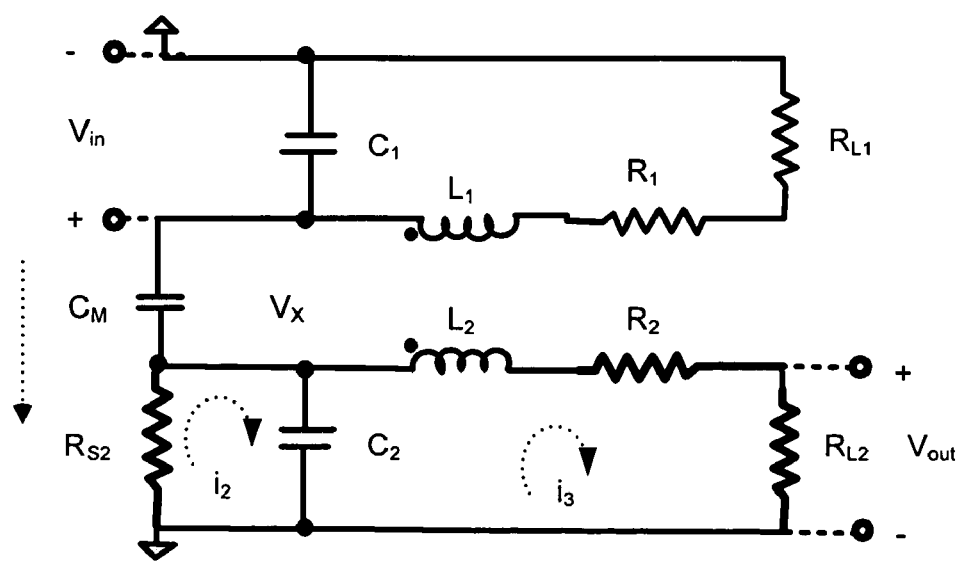
FIG. 2B is a lumped element equivalent circuit of a lossy transmission line coupler in accordance with an embodiment of the present invention.

A microstrip parallel coupled-line (or edge coupled) structure may be applied as a UWB differentiator by using the mutual capacitance that exists between the two conductors in an RC network. A schematic of a single section microstrip coupled-line coupler is shown in FIG. 2A. The amount of capacitance is a function of the distance between the conductors, which can be adjusted to be small enough to support sub-nanosecond transients. Application of Kirchhoff's current law (KCL) to a lumped element equivalent circuit of a coupled-line coupler, as shown in FIG. 2B, yields $$\frac{V_{out}}{R_{L2}} = [C_M - C_2(K-1)]\frac{dV_{in}}{dt} - \underbrace{\frac{V_{in}(K-1)}{R_{S2}}}_{\text{Not differentiated}} \quad (1)$$

A detailed proof of Equation (1) is provided below. Equation (1) demonstrates that the output voltage $V_{out}$ is formed by differentiating the voltage at the input of the coupled-line coupler. In addition, this equation shows a second term that is not differentiated, which conditionally dominates the expression. This condition is illuminated in the consideration that parasitic capacitance in the line is very small, the term $C_M - C_2 \cdot (K-1)$ of Equation (1) is less than the $(K-1)/R_{S2}$ term. As a result, the derivative term only dominates under the condition that the rate of change in the input signal follows the relationship:

$$\frac{dV_{in}}{dt} \gg V_{in} \quad (2)$$

This relation is true for signals with a very sharp rise time, which is one of the characteristics of a UWB signal. Thus, the coupled-line coupler may act as a UWB differentiator.

Figure 3A:
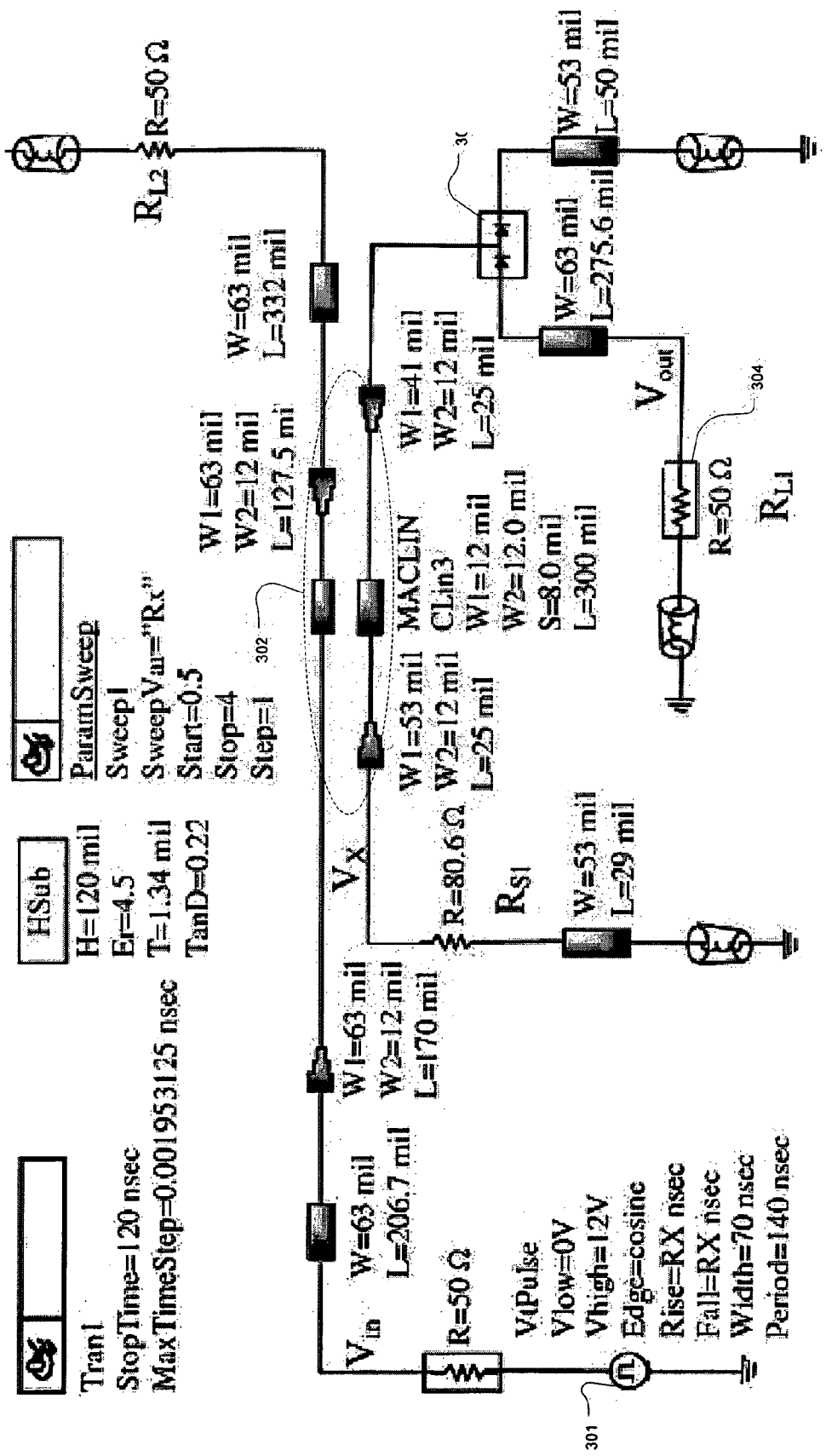
FIG. 3A is an ADS schematic block of a single section microstrip coupled-line coupler in accordance with an embodiment of the present invention.
Figure 3B:
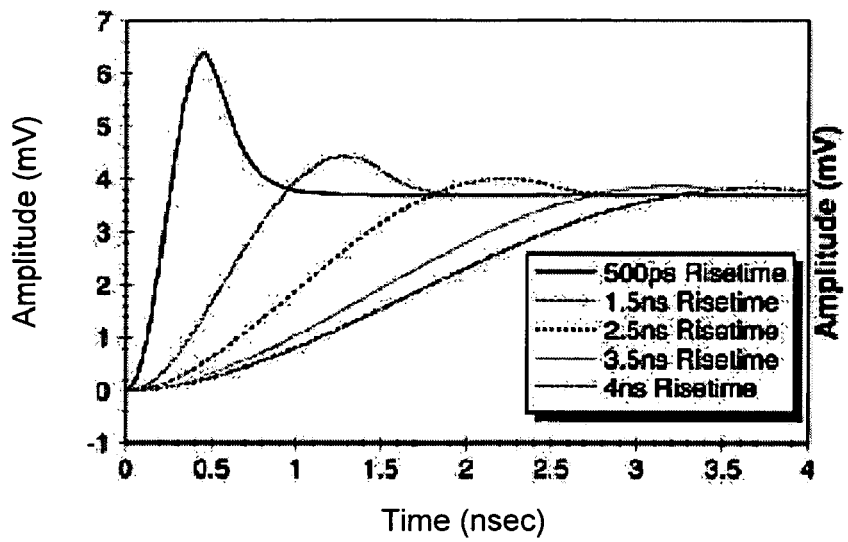
FIG. 3B is a graph of the variable rise time input at $V_{in}$ of the coupled-line coupler of FIG. 3A.

The above conditional derivative was verified by capturing a coupled-line circuit in Agilent Advanced Design System (ADS) 2004A and performing a transient/convolution simulation. The ADS schematic block of the single section microstrip coupled-line coupler is shown in FIG. 3A. Input port 301 to this line was excited with a square wave with a variable rise time, as shown in the graph of FIG. 3B. Coupled-line coupler 302 responded to this stimulus by producing positive and negative amplitude Gaussian pulses from the falling and rising edges of the square wave. The positive amplitude Gaussian was filtered using Schottky detector diode 303 and the negative pulse was measured across load 304 at the circuit output.

Figure 3C:
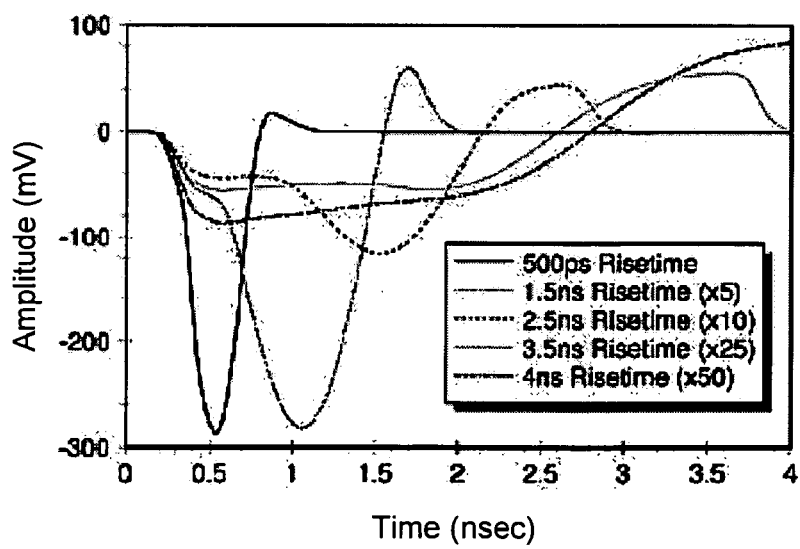
FIG. 3C is a graph of the output waveform at $V_{out}$ of the coupled-line coupler of FIG. 3A.

After simulating over a 140-144 nsec time period, the circuit output showed waveform differentiation for fast rise square waves. As the rise time of the input signal increased, the circuit response became less like a derivative and more like a square wave, as shown in FIG. 3C. Therefore, the simulation provided confirmation of the differentiated waveform in Equation (2) for fast rise signals as well as the dominance of the non-differentiated part of the equation as rise time increased. Moreover, coupled-line coupler differentiation is rooted in the construction of an RC network using the junction and parasitic capacitances in the coupled-line structure.

UWB Schottky Detector Differentiator

Because capacitance contributes to waveform differentiation in coupled-line structures, a Schottky detector diode was also considered for differentiation. A Schottky diode is advantageous for its low forward voltage (typically 0.3 volts) and very fast switching action. These diodes are used in switch-mode power converters, discharge protection circuits, and other applications requiring fast picosecond switching. Moreover, Schottky diodes are used in the development of UWB circuits. The fast switching time in the Schottky diode is made possible by the metal-semiconductor junction that comprises its physical structure, which promotes fast injection of majority carriers into the conduction band. Schottky diodes are the fundamental component of detector circuits, which recover baseband information from a modulated wave. As a result, the diode is applied in this work as a Schottky detector differentiator as well as an envelope detector for smoothing high frequency oscillations in the UWB waveforms.

A Schottky detector differentiator is based on configuring an RC network from the capacitance that exists at the diode junction. In classical device physics, a steady state diode is viewed as a short or open circuit, as a function of whether it is in forward or reverse bias. In reality, a junction capacitance (depletion capacitance) is formed as the voltage across the p-n junction changes to the reverse direction and a diffusion capacitance is formed in the forward direction.

Figure 4A:
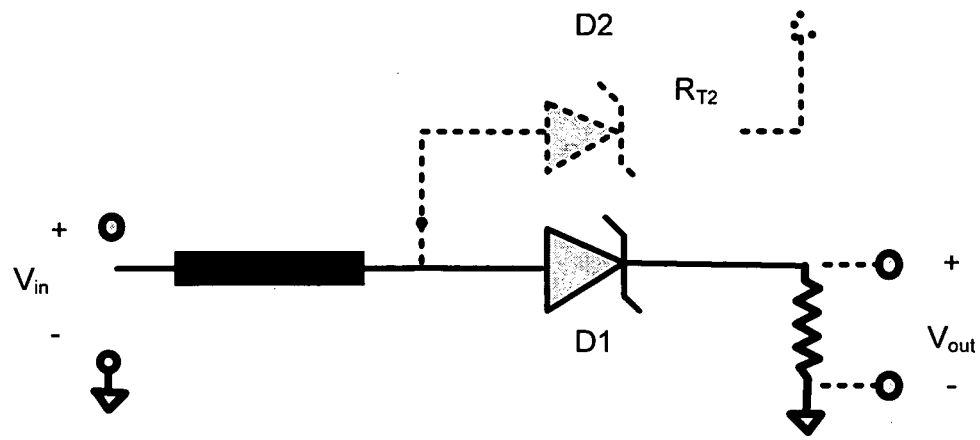
FIG. 4A is a schematic of a Schottky detector diode differentiator in accordance with an embodiment of the present invention.

The depletion capacitance ($C_j$) relates to charge storage in the diode and is expressed as $$C_j = \frac{C_{j0}}{\left(1 + \frac{V_R}{V_o}\right)^m}, \quad (3)$$

where $C_{j0}$, the zero biased junction capacitance is equal to $$\sqrt{\left(\frac{\epsilon_s q}{2}\right)\left(\frac{N_A N_D}{N_A + N_D}\right)\left(\frac{1}{V_0}\right)},$$

where $V_R$ is the reverse voltage, $V_0$ is the depletion-layer voltage, m is the grading coefficient, $\epsilon_s$ is the materials electrical permittivity, q is the stored charge, $N_A$ is the doping concentration in the p-side of the junction, and $N_D$ is the concentration in the n-side junction. The diffusion capacitance ($C_D$) relates to the switching action of the diode. This capacitance is expressed as follows:

$$C_D = \left(\frac{\tau_T}{V_T}\right) \cdot I, \quad (4)$$

where $\tau_T$ is the mean transit time (or switching time) of the diode, $V_T$ is the thermal voltage of the diode, and I is the diode current at the bias point. In the circuit of FIG. 4A, two diodes were used, first diode (D1) for RC differentiation and second diode (D2) for filtering.

Figure 4B:
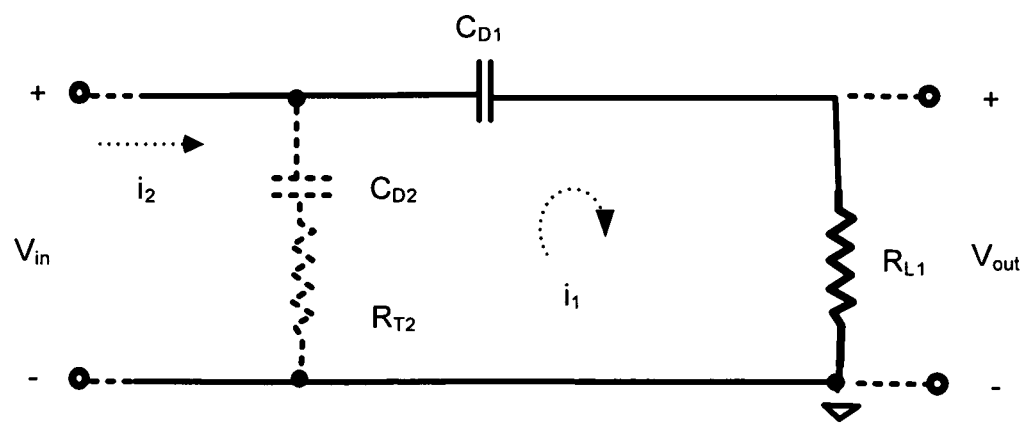
FIG. 4B is a lumped element equivalent circuit of a Schottky detector diode differentiator in accordance with an embodiment of the present invention.

The differentiator is compatible with UWB waveforms because the diffusion capacitance that exists at the p-n junction is very small when placed in an RC configuration. A lumped element equivalent circuit of a series diode, as shown in FIG. 4B, demonstrates that differentiation occurs as the input ($V_{in}$) energizes the Schottky diode ($D_1$ and $D_2$) and appears across the ($R_{L1}$) load. Application of KCL to this equivalent circuit provides a means to relate the output ($V_{out}$) to this input ($V_{in}$). An analysis of the output in loop 1 ($i_1$) gives rise to the following relationship:

$$V_{out} = R_{L1} C_{D1} \frac{dV_{in}}{dt} - \underbrace{R_{L1} C_{D1} C_{D2} R_{T2} \frac{d^2 V_{C_{D2}}}{dt^2}}_{\text{Second Order Differential}}, \quad (5)$$

where $C_{D1}$ is the junction capacitance for diode $D_1$, $C_{D2}$ is the junction capacitance for diode $D_2$, $V_{CD2}$ is the voltage across diode $D_2$, and $R_{T2}$ is the load at the diode output. In Equation (5) a second order differential is observed. However, this term may be eliminated by requiring $R_{T2} \ll R_{L1}$, which can be accomplished by grounding the D2 diode.

Figure 5A:
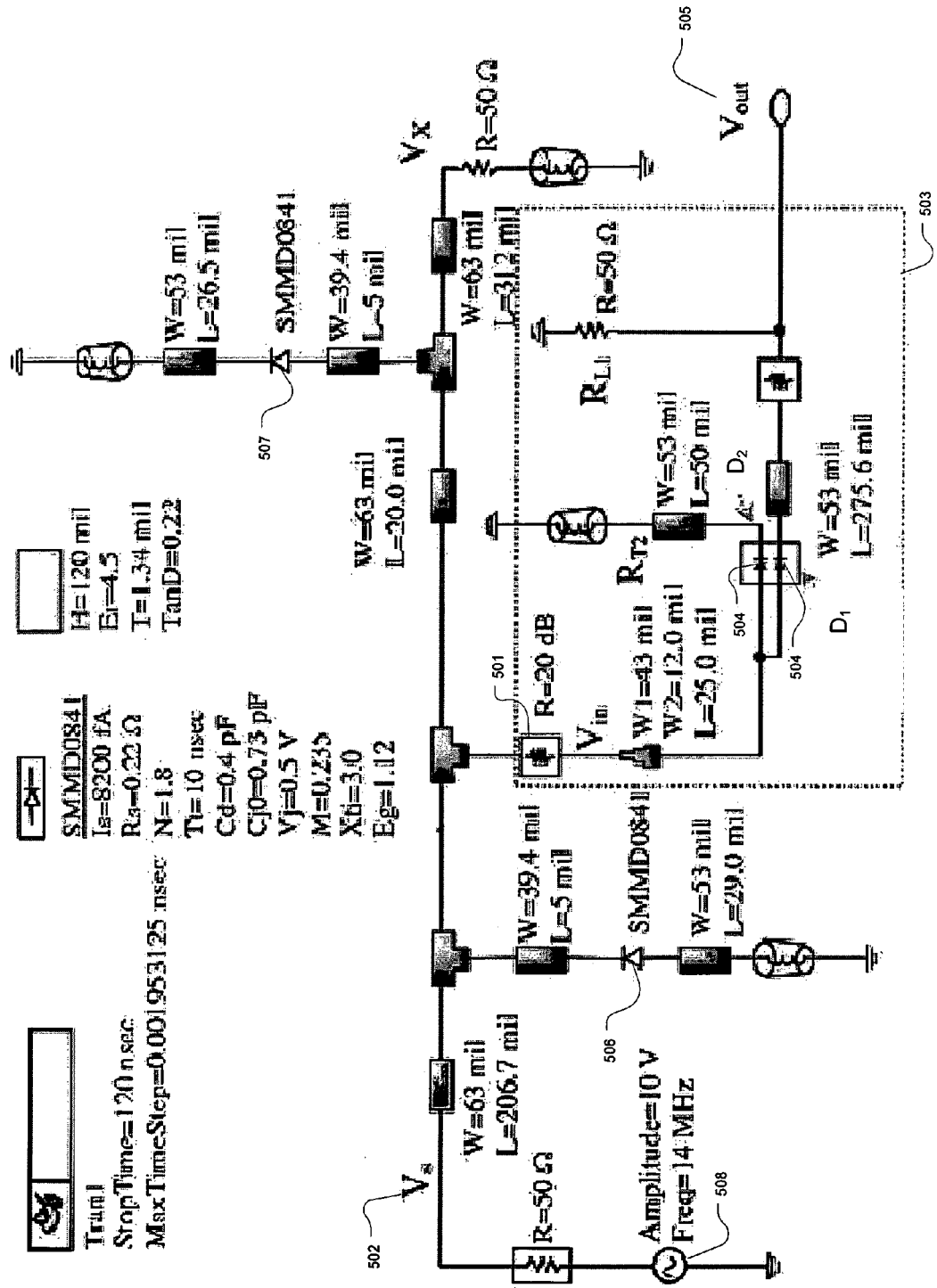
FIG. 5A is an Advanced Design System (ADS) schematic block of a Schottky detector diode differentiator in accordance with an embodiment of the present invention.
Figure 5B:
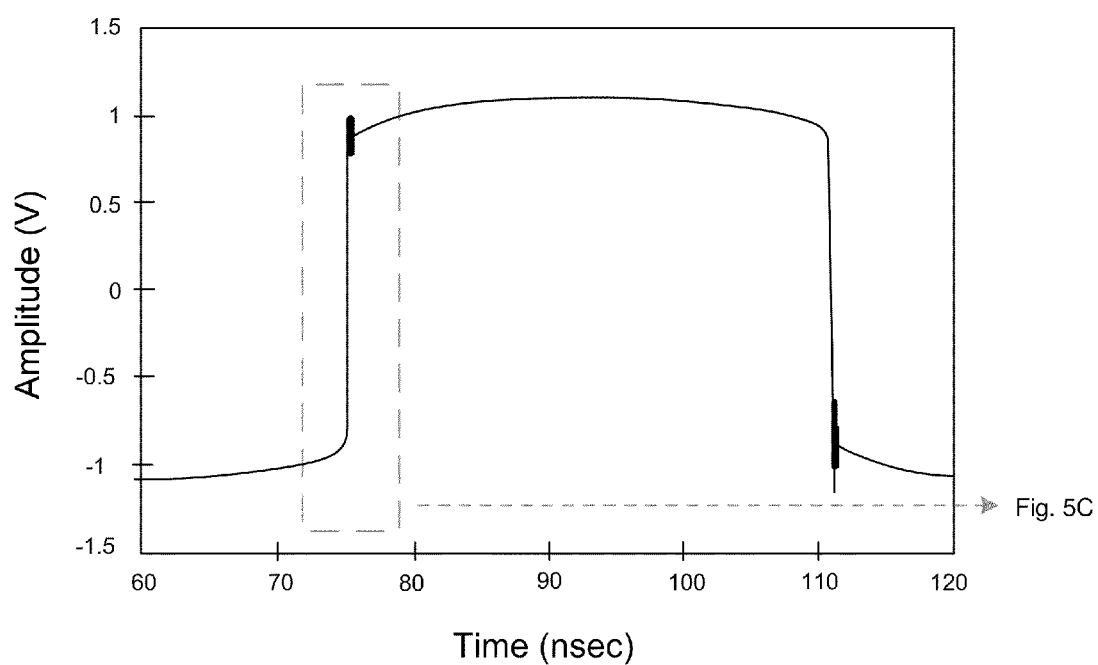
FIG. 5B is graph of the $V_x$ square wave response of the Schottky detector diode differentiator of FIG. 5A.

The derivative in Equation (5) was verified in simulation by capturing a Schottky detector differentiator circuit using Agilent ADS 2004A. The ADS schematic block of Schottky detector diode differentiator 503 is shown in FIG. 5A. In this circuit, a HSMS-286x series Schottky detector diode was used. This diode has a typical capacitance of 0.25 pF, voltage sensitivity of 35 mV/W at 2.45 GHz, and 915 MHz to 5.8 GHz operational range. The circuit in FIG. 5A applies forward and reverse step recovery diodes 506, 507 to transform a 14 MHz sinusoidal waveform input at input port 508 to a square wave by compressing its rising and falling edges, as shown in the graph of FIG. 5B.

Figure 5C:
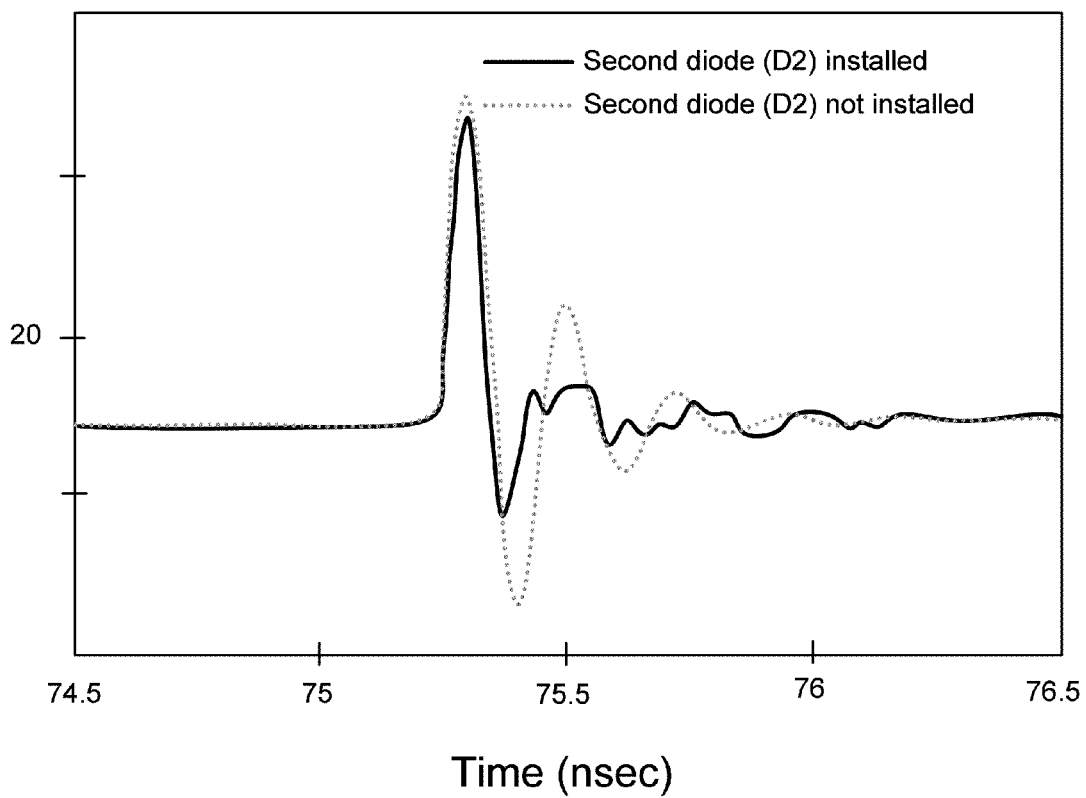
FIG. 5C is a graph of the $V_{out}$ output waveform of the Schottky detector diode differentiator of FIG. 5B.

20 dB attenuator 501 is used in this circuit to isolate source ($V_S$) 502 from the waveforms generated by Schottky detector differentiator 503. When Schottky diode $D_2$ 504 is not installed, a second derivative appears in the output ($V_{out}$) 505, as shown in the graph shown in FIG. 5C and as indicated by Equation (5). A Gaussian waveform results when this diode is installed. These results demonstrate the capacity for a Schottky diode to differentiate a time-domain waveform.

Multi-Port Circuit for Simultaneous Shaping of Sub-Nanosecond Pulses (MCS$^3$P)

As shown in the simplified block diagram of FIG. 1, the coupled-line coupler and Schottky detector diode differentiators were combined to implement a multi-port circuit for simultaneous shaping of sub-nanosecond pulses (MCS$^3$P). This circuit produces different UWB waveforms that are aligned to the same reference. The MCS$^3$P comprises input port 101, circuitry to compress the rising edge of a waveform 102, coupled line differentiator 103, circuitry to compress the falling edge of a waveform 104, first output port 105, clamping and filter circuit 106, second output port 107, Schottky detector differentiator 108, and third output port 109. A sinusoidal waveform is taken as input at input port 101, and the rising edge of the input waveform are compressed using circuitry to compress the rising edge of a waveform 102, such as a step recovery diode. Then the waveform with rising edge compressed is differentiated by coupled line differentiator 103 to form a square waveform and a Gaussian waveform. The falling edge of the square waveform is compressed by circuitry to compress the falling edge of a waveform 104, such as a step-recovery diode, resulting in a square waveform, which is output at first output port 105. Clamping and filter circuit 106 receives the Gaussian waveform and then clamps the positive going Gaussian and passes the negative going Gaussian waveform. The negative going Gaussian waveform is then output at second output port 107. Alternatively, clamping and filter circuit 106 clamps the negative going Gaussian and passes the positive going Gaussian, which is then output at second output port 107. Schottky detector differentiator 108 also receives the Gaussian waveform. It differentiates the Gaussian waveform to form a monocycle waveform, which is output at third output port 109.

Figure 6:
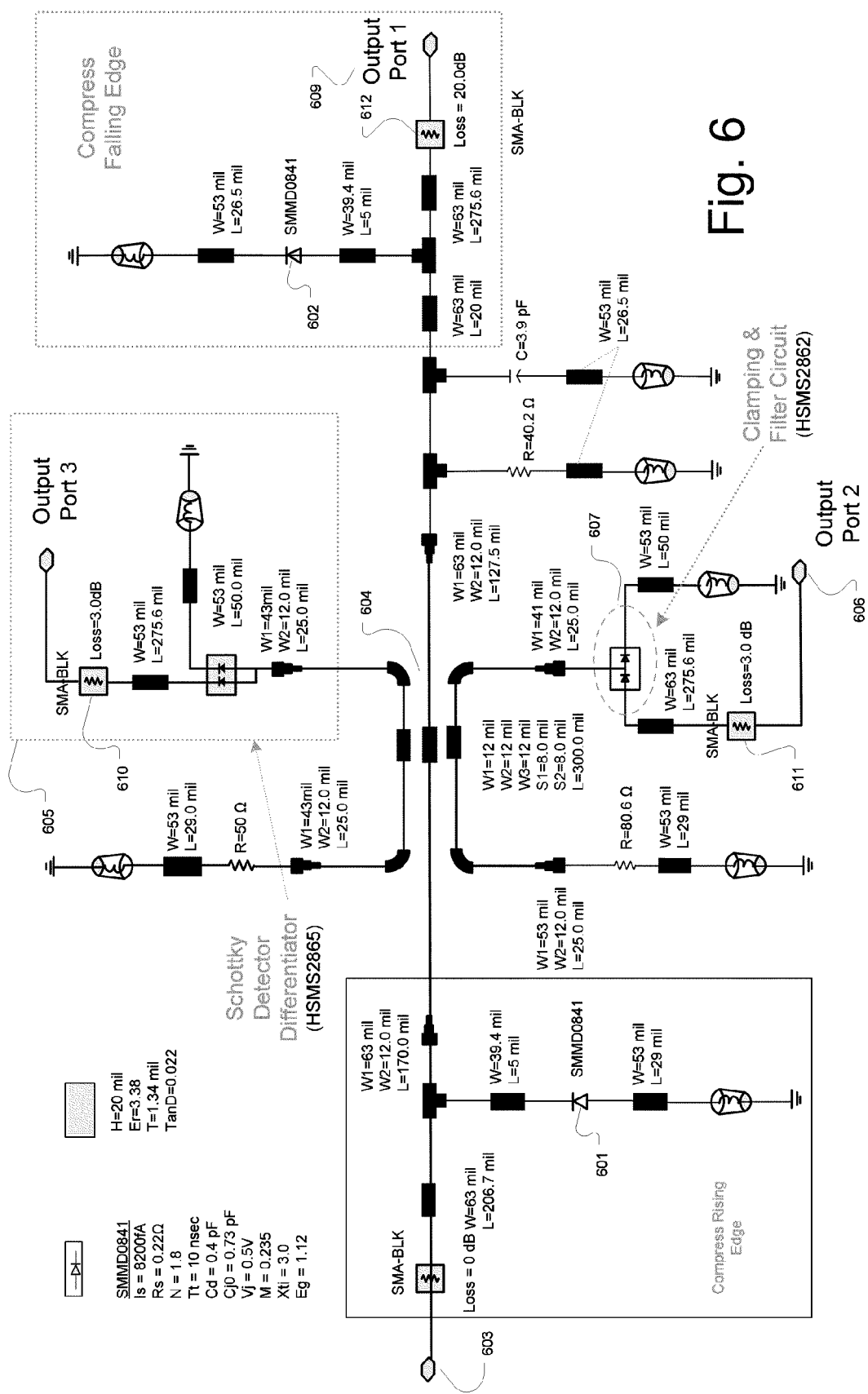
FIG. 6 is a schematic block of the designed $MCS^3P$ in accordance with an embodiment of the present invention.

A detailed schematic block diagram of an exemplary embodiment of the MCS$^3$P is shown in FIG. 6. In this circuit, forward and reverse biased step recovery diode 601, 602, such as Metelics SMMD-0841, modifies the rising (601) and failing (602) edges of a 14 MHz, 10 Vpp sinusoidal input, which is input at input port 603. Three-section coupled-line coupler 604 differentiates the square wave and provides a means to isolate Schottky detector differentiator 605 (in lieu of a 20 dB attenuator). A microstrip, asymmetric three-section coupled-line coupler (model MACLIN3) was used in simulation. The differentiated square wave with rising and falling edges compressed is output at first output port 609.

On one side of coupler 604, the positive going Gaussian was clamped and the negative going Gaussian supplied to second output port 606 through Schottky detector diode 607. A HSMS-2862 Schottky detector diode was used for simulation.

Schottky detector differentiator circuit 605 was placed on the adjacent side of coupler 604, from which a monocycle was formed from the Gaussian input. The monocycle was then output at third output port 608.

Figure 7A:
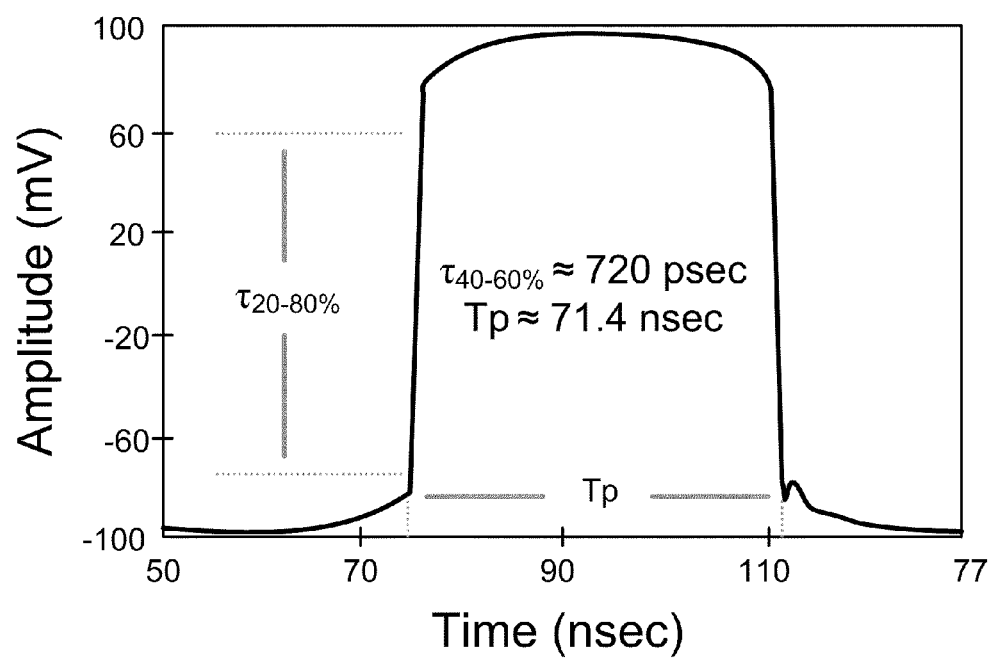
FIG. 7A is a graph of the time-domain response of the square wave at output port 1 of the $MCS^3P$.
Figure 7B:
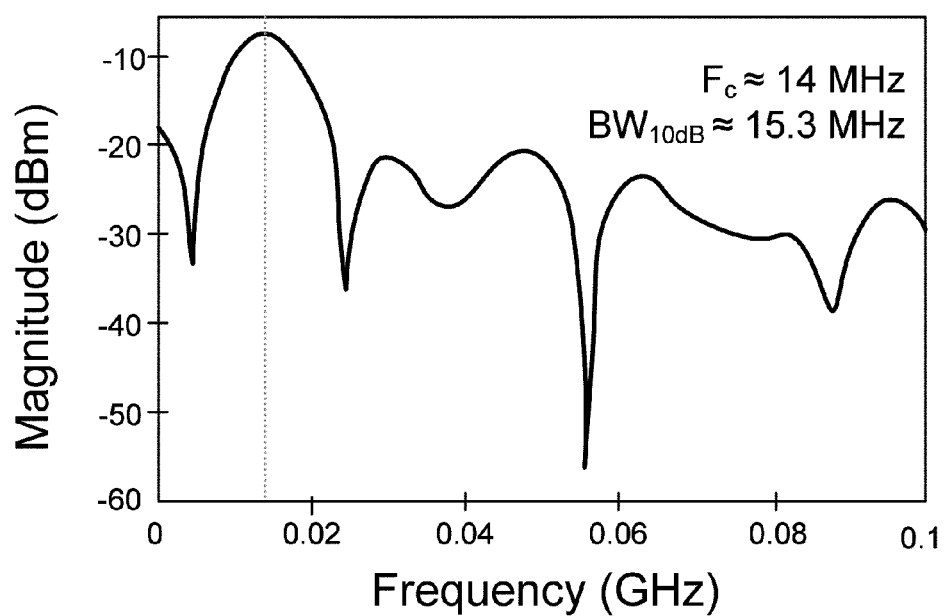
FIG. 7B is a graph of the frequency-domain response of the square wave at output port 1 of the $MCS^3P$.
Figure 7C:
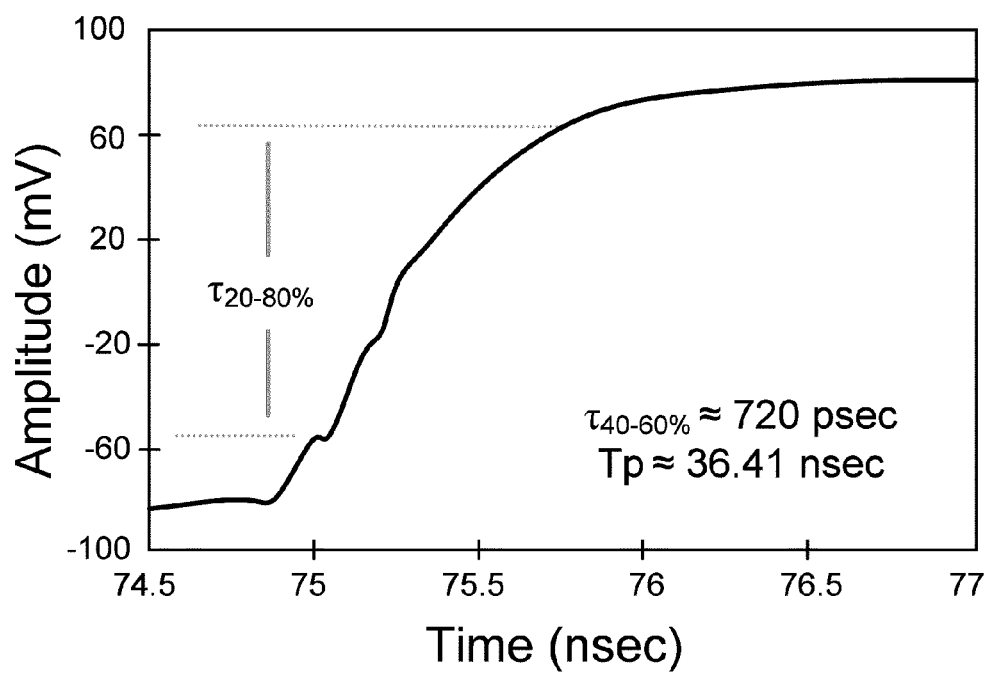
FIG. 7C is a graph of the time-domain response of the step response associated with the square wave at output port 1 of the $MCS^3P$.
Figure 7D:
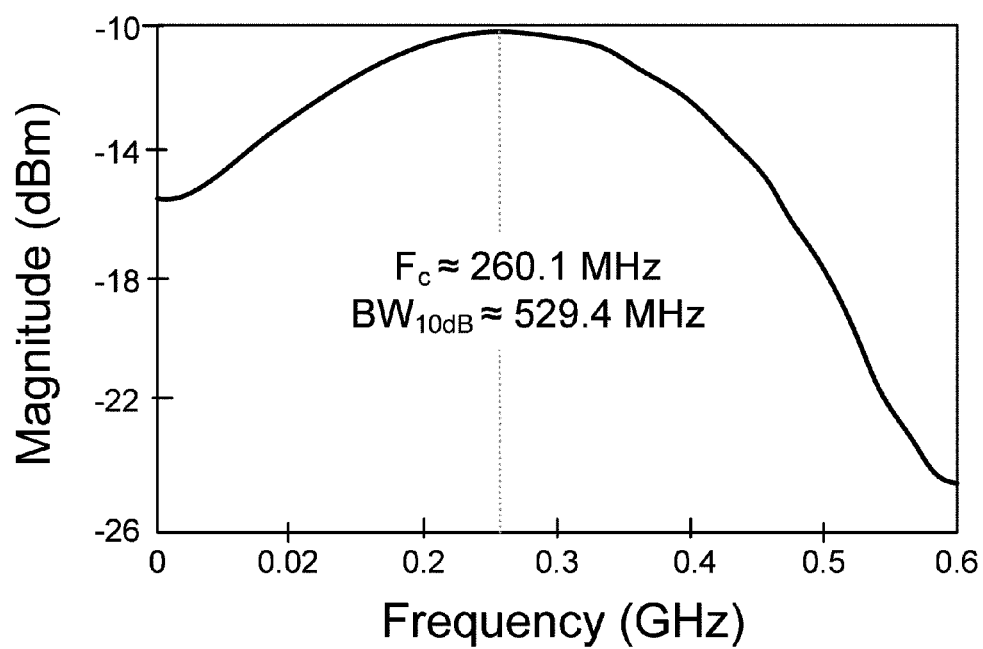
FIG. 7D is a graph of the frequency-domain response of the step response associated with the square wave at output port 1 of the $MCS^3P$.
Figure 7E:
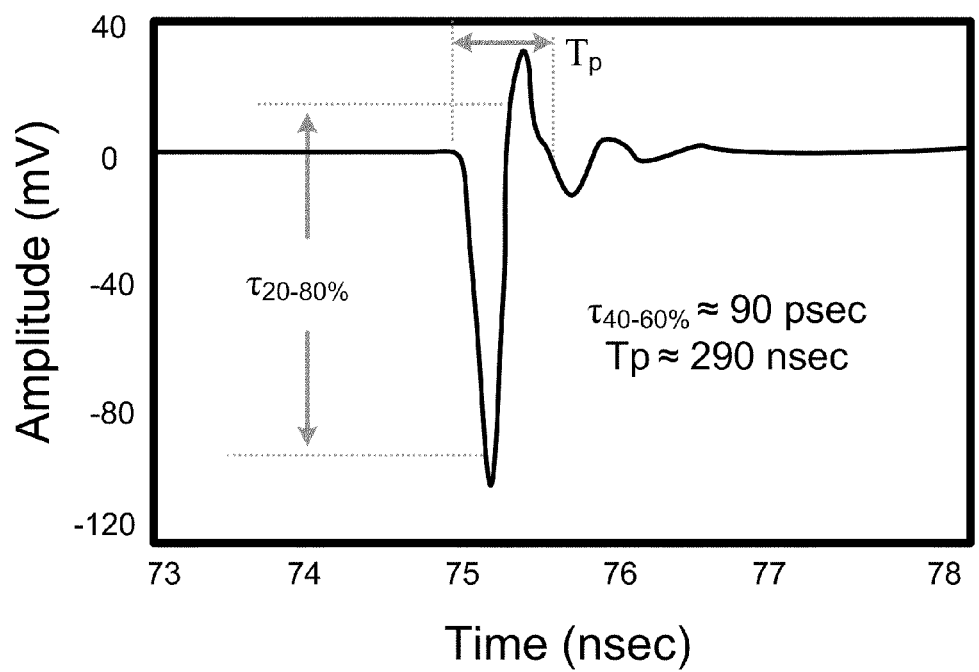
FIG. 7E is a graph of the time-domain response of the Gaussian wave at output port 2 of the $MCS^3P$.
Figure 7F:
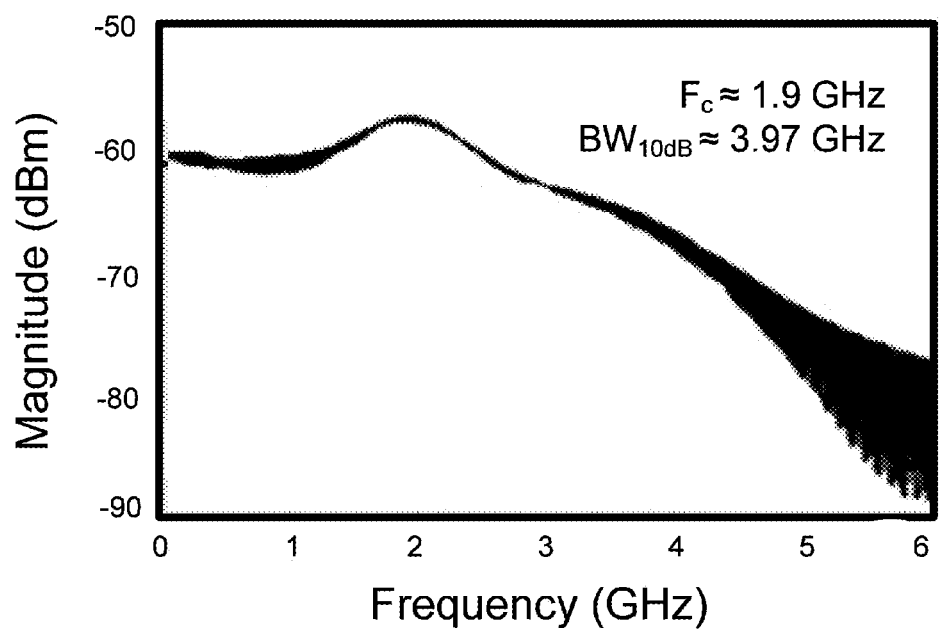
FIG. 7F is a graph of the frequency-domain response of the Gaussian wave at output port 2 of the $MCS^3P$.
Figure 7G:
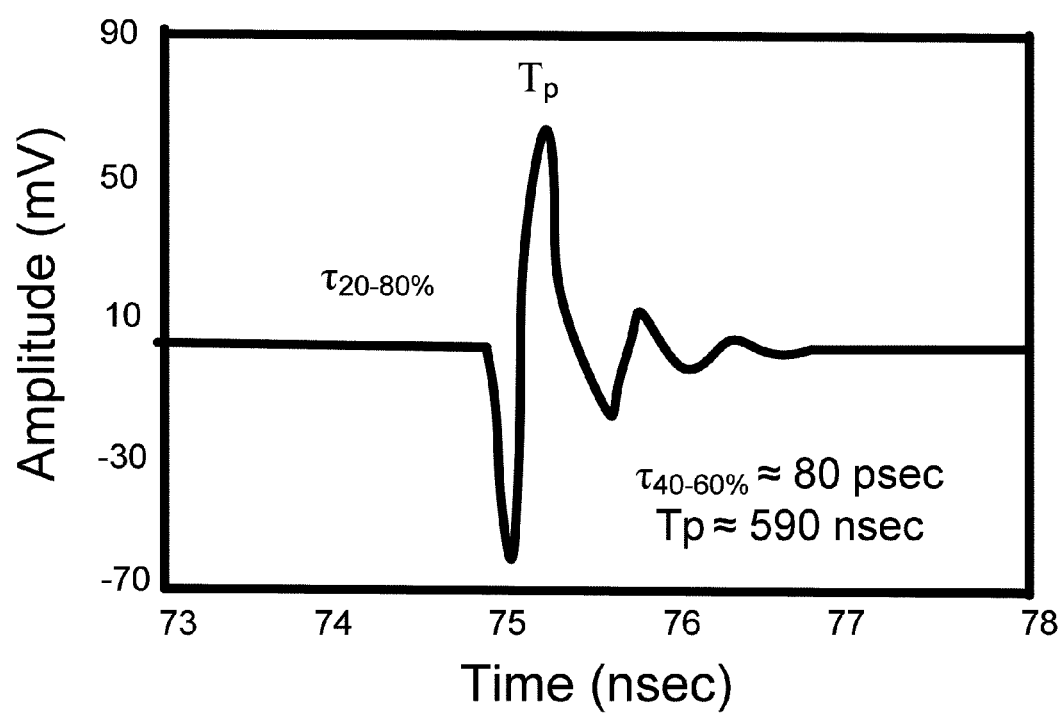
FIG. 7G is a graph of the time-domain response of the monocycle wave at output port 3 of the $MCS^3P$.
Figure 7H:
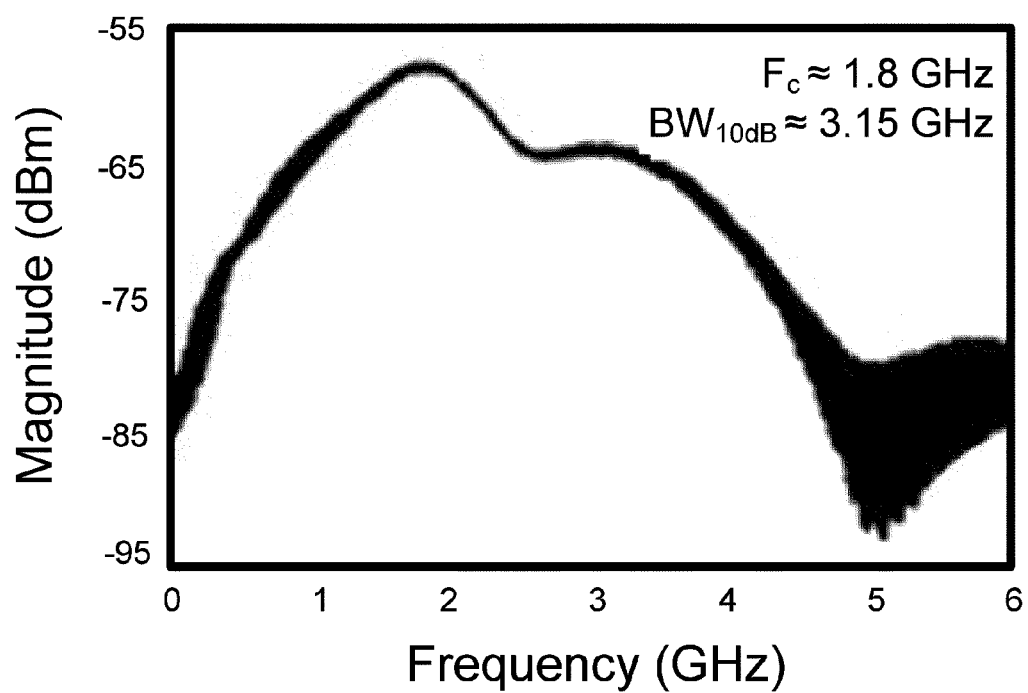
FIG. 7H is a graph of the frequency-domain response of the monocycle wave at output port 3 of the $MCS^3P$.

The MCS$^3$P circuit was simulated in ADS 2004A, using a transient/convolution simulator. The waveforms supplied to and generated by the MCS$^3$P are shown in FIG. 7. FIGS. 7A and 7B show the square waveform at first output port 609. FIGS. 7C and 7D show the step response associated with the square-wave. FIGS. 7E and 7F show the Gaussian at second output port 606, and FIGS. 7G and 7H show the monocycle at third output port 608. The multi-port circuit generated a square-wave with a 20-80% rise time of 720 psec, from which a Gaussian with a full-width pulse duration of 290 psec and monocycle with a duration of 590 psec were produced. A Fourier transform of the step response associated with the square wave has a 529.4 MHz bandwidth that meets the FCC UWB specification results (see FIG. 7D). However, the same edge rate applied to a square wave response does not meet the FCC specification due to the nulls that are introduced at harmonics of the cycle frequency (see FIG. 7B). This suggests that a fast rise time step-function may be UWB but not its square wave response. However, the square wave response was used to produce Gaussian and monocycle pulses with a 3.97 GHz and 3.15 GHz bandwidths, respectively. The signals at second output port 606 and third output port 608 were terminated with 3 dB attenuators 610, 611 to control line reflections and first output port 609 was terminated with 20 dB attenuator 612 to meet the signal level requirement for measurement.

Figure 8:
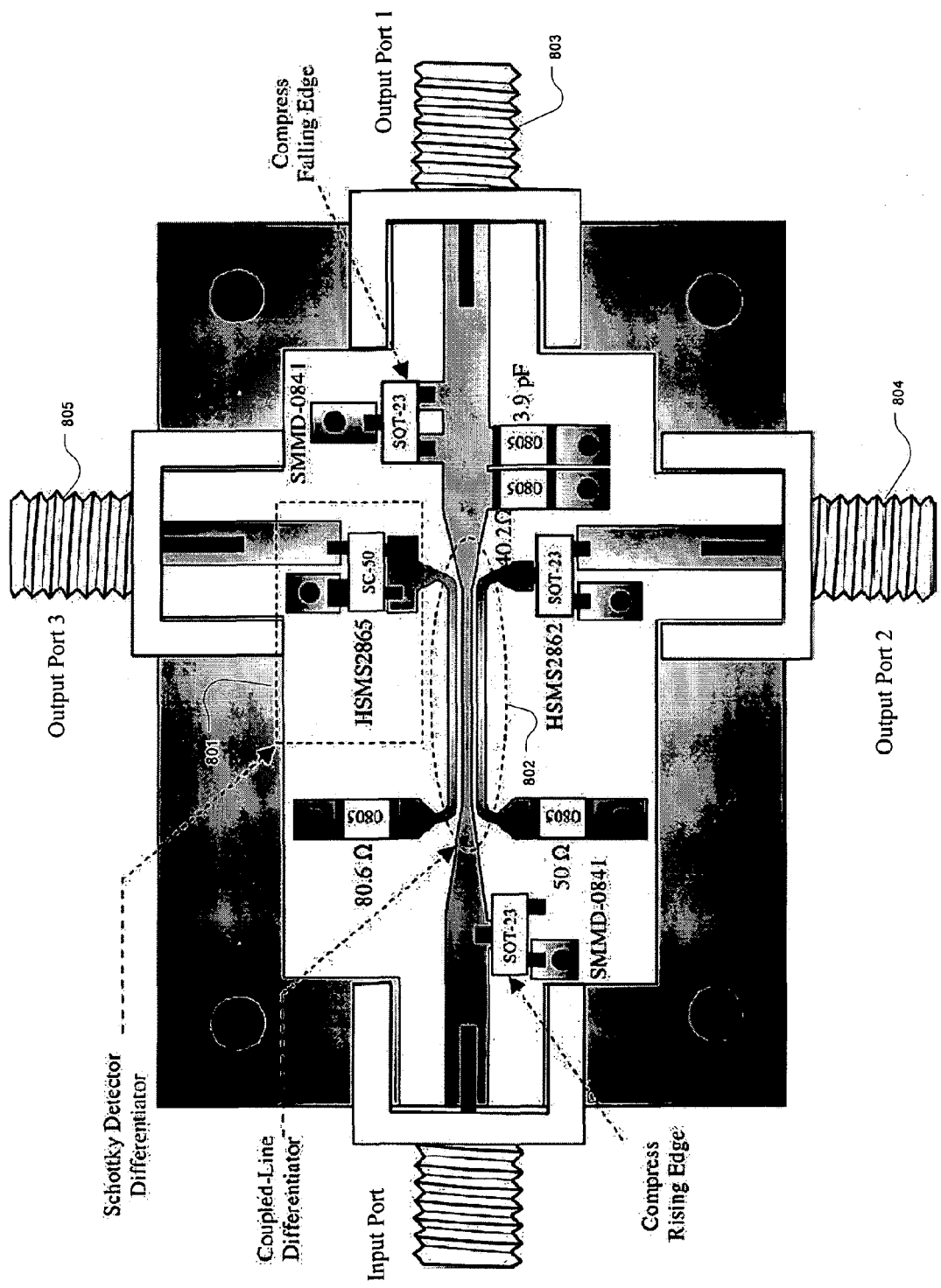
FIG. 8 is a component layout for the multi-port circuit for simultaneous shaping of sun-nanosecond pulses ($MCS^3P$) with SMA connectors attached in accordance with an embodiment of the present invention.

Following simulation, the MCS$^3$P was fabricated on a Rogers Corporation RO4003 substrate ($\epsilon_r$=3.38, tan d=0.022, and thickness h=0.51 mm). FIG. 8 shows the layout of the implemented MCS$^3$P, which has Schottky detector differentiator 801 and coupled-line coupler differentiator 802 as discussed previously. The circuit has a dimension of 41.9 mm×31.8 mm. Dimensions for the transmission lines are given in the schematic of FIG. 6. The printed circuit board (PCB) was populated with surface mount components, including 0805 chip capacitors and resistors. Johnson SMA edge mount connectors (142-0761-871) were used to interface with the PCB.

Figure 9A:
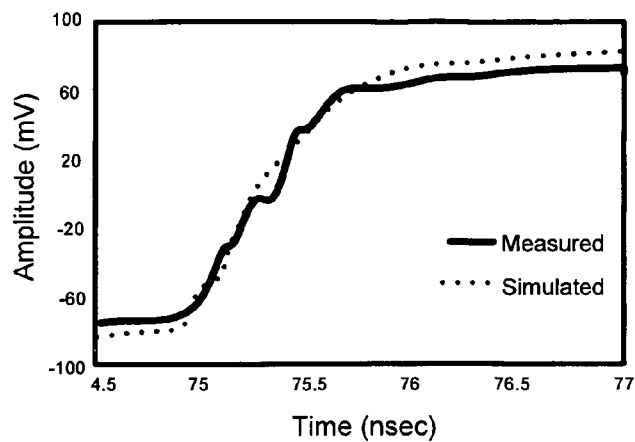
FIG. 9A is a graph showing the measured and simulated waveform response for the edge compression sub-circuit.
Figure 9B:
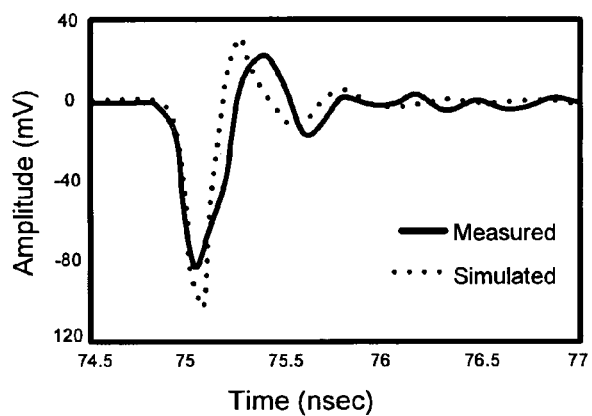
FIG. 9B is a graph showing the measure and simulated waveform response for the coupled-line coupler differentiator sub-circuit.
Figure 9C:
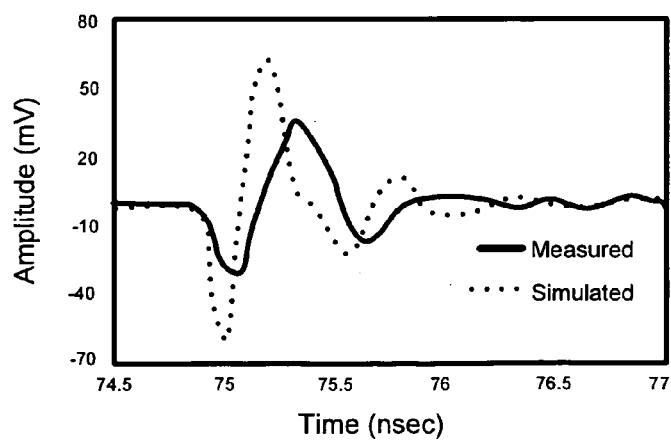
FIG. 9C is a graph showing the measure and simulated waveform response for the Schottky detector differentiator sub-circuit.

A 20 GHz digitizing oscilloscope (HP 54750A)—configured for 128-bit averaging—was used to measure the response of the MCS$^3$P. As predicted in simulation, waveforms measured at first output port 803, second output port 804, and third output port 805 followed the expected morphology of a square wave, Gaussian, and monocycle shape, respectively. The 20-80% rise time measured for the square wave was 850 psec where as the simulated rise time was 720 psec. A good fit was achieved for the amplitude and morphology of simulated and measured square wave, as shown in FIG. 9A. The Gaussian waveform measured at third output port 805 demonstrated a pulse-duration that was 100 psec greater than simulated, as shown in FIG. 9B. Finally, the monocycle pulse measured at second output port 804, as shown in FIG. 9C, showed less agreement between simulated and measured data. Because the monocycle was constructed by differentiating the response of a coupled-line derivative, differences in the simulated and measured Gaussian were compounded as the square wave was subjected to the coupled-line followed by Schottky detector differentiation. Nonetheless, a monocycle pulse was distinguishable in the morphology of the measurement. As such, practical implementation of a coupled-line coupler differentiator and Schottky detector differentiator is possible. These differentiators provide alternative approaches to UWB pulse differentiation and support the possibility of using other microwave structures for achieving passive RC networks.

Proof of Coupled-Line Coupler Differentiator Equation—Equation (1)

Application KCL and KVL to a lumped element equivalent circuit of a coupled-line coupler, demonstrates its potential as a differentiator (see FIG. 2). This potential is seen by relating the output voltage ($V_{out}$) to the input voltage ($V_{in}$). This relationship can be determined by applying KCL to the output in loop 3 ($i_3$), which produces the following relationship:

$$V_0 = i_3 R_{L2}, \quad (6)$$

where $R_{L2}$ is the resistive load over which the output is measured. The above equation can be expanded by relating $i_3$ to $i_2$ of loop 2 in an evaluation of the current through the $C_2$ capacitor. This relationship is represented by the following equation:

$$i_3 = i_2 - i_{C2} = i_2 - C_2 \frac{dV_{C2}}{dt}, \quad (7)$$

where $i_{C2}$ is the current through capacitor $C_2$ and $V_{C2}$ is the voltage across that capacitor. Similarly, $i_2$ relates to $i_1$ of loop 1 by evaluating the current through resistor $R_{S2}$ and capacitor $C_M$, which yields the following relations:

$$i_2 = i_1 - i_{R_{S2}} = i_1 - \frac{V_X}{R_{S2}} \text{ and} \quad (8)$$

$$i_1 = C_M \frac{dV_{C_M}}{dt}, \quad (9)$$

where $i_{R_{S2}}$, $V_{C_M}$, and $V_X$ are the current through the resistor $R_{S2}$, voltage across the capacitor $C_M$, and nodal voltage, respectively. Application of Equations (7) through (9) to Equation (6) gives rise to a relationship for the output voltage that includes the coupling capacitance, which takes the following form:

$$\frac{V_{out}}{R_{L2}} = C_M \frac{dV_{C_M}}{dt} - \frac{dV_X}{R_{S2}} - C_2 \frac{dV_{C2}}{dt}. \quad (10)$$

The nodal voltage $V_X$ and capacitor voltage $V_{C_2}$ may be related to the input voltage by recognizing that $V_{C_2}$ and $V_X = V_{in} - V_{C_M}$, so that Equation (10) may be represented in terms of the input voltage, as shown by the following expression:

$$\frac{V_{out}}{R_{L2}} = C_M \frac{dV_{C_M}}{dt} - \frac{V_{in} - V_{C_M}}{R_{S2}} - C_2 \frac{d(V_{in} - V_{C_M})}{dt}. \quad (11)$$

If proportionality is assumed for the input and coupled voltages so that $V_{C_M} = KV_{in}$ where K is a constant, then the output may be related primarily in terms of the voltage across the mutual capacitance. As a result, Equation (6) takes on the form:

$$\frac{V_{out}}{R_{L2}} = [C_M - C_2(K-1)] \frac{dV_{in}}{dt} - \underbrace{\frac{V_{in}(K-1)}{R_{S2}}}_{Non-Differentiated}. \quad (12)$$

Proof of Schottky Detector Differentiator Equation—Equation (5)

Application of KCL to the equivalent circuit in FIG. 4B provides a means to relate the output ($V_{out}$) to this input ($V_{in}$).

An analysis of the output in loop 1 ($i_1$) gives rise to the following relationship:

$$V_{out} = i_1 \cdot R_{L1} = R_{L1} C_{D1} \frac{dV_{C_{D1}}}{dt}, \quad (13)$$

where $R_{L1}$ is the load, $C_{D1}$ is the junction capacitance for diode D1, and $V_{C_{D1}}$ is the voltage across that diode. This relationship may be expressed in terms of the input by considering that $V_{C_{D1}} = V_{in} - V_{out}$, which produces the following expression when substituted into Equation (13) above:

$$V_{out} = R_{L1} C_{D1} \frac{dV_{in}}{dt} - \underbrace{R_{L1} C_{D1} \frac{dV_{out}}{dt}}_{First\ Order\ Differential}. \quad (14)$$

As a result, a first order differential in Equation (14) distorts the waveform. The effects of this term may be minimized by adding a path through Schottky diode D2, as shown in FIG. 4A. This path provides a means to describe the input voltage using the following equation:

$$V_{in} = V_{C_{D2}} + (i_2 - i_1) R_{T2} = R_{T2} C_{D2} \frac{dV_{C_{D2}}}{dt}, \quad (15)$$

where $i_2$ is the loop 2 current, $V_{C_{D2}}$ is the voltage across diode D2 and $C_{D2}$ is the junction capacitance. This input may be expressed in terms of the output, as shown by:

$$V_{out} = V_{in} - V_{C_{D1}} = V_{C_{D2}} + R_{T2} C_{D2} \frac{dV_{C_{D2}}}{dt} - V_{C_{D1}}. \quad (16)$$

If (16) is differentiated, the following expression results:

$$\frac{V_{out}}{dt} = \frac{dV_{C_{D2}}}{dt} + R_{T2} C_{D2} \frac{d^2 V_{C_{D2}}}{dt^2} - \frac{dV_{C_{D1}}}{dt}, \quad (17)$$

which may be reduced by considering that $C_{D1} = C_{D2}$ and $V_{C_{D1}} = V_{C_{D2}}$, which yields:

$$\frac{dV_{out}}{dt} = R_{T2} C_{D2} \frac{d^2 V_{C_{D2}}}{dt^2}. \quad (18)$$

If the expression in Equation (18) is substituted for on the right side of Equation (14) and the expression $C_x = C_{D1}$ and $C_{D2}$ is considered, the final output takes the form:

$$V_{out} = R_{L2} C_X \frac{dV_{in}}{dt} - \underbrace{R_{L1} C_X^2 R_{T2} \frac{d^2 V_{C_{D2}}}{dt^2}}_{Second\ Order\ Differential}. \quad (19)$$

In Equation (19) the second order differential is also notable. However, a solution to a first order derivative can be seen more clearly. The second order term may be eliminated by requiring that $R_{T2} \ll R_{L1}$, which can be accomplished by grounding the diode, so that $$V_{out} = R_{L2} C_X \frac{dV_{in}}{dt}. \qquad (20)$$

UWB waveform differentiation was made possible by mitigating the effects of parasitics in the transmission line. Application of KCL to the equivalent circuit reveals the presence of a derivative as well as other parasitics that contribute to the waveform morphology. For coupled-line coupler differentiators the effect of parasitics in the transmission line is minimized by ensuring that the rate of change in the input signal is very large. The Schottky detector diode differentiator requires introduction of another shunt diode to attenuate the second order derivative, which would otherwise dominate the circuit response. These structures offer alternatives to UWB pulse shaping, which may solve problems with signal isolation and circuit complexity at the expense of a smaller signal levels.

Method of Simultaneously Shaping UWB Pulses

Figure 10:
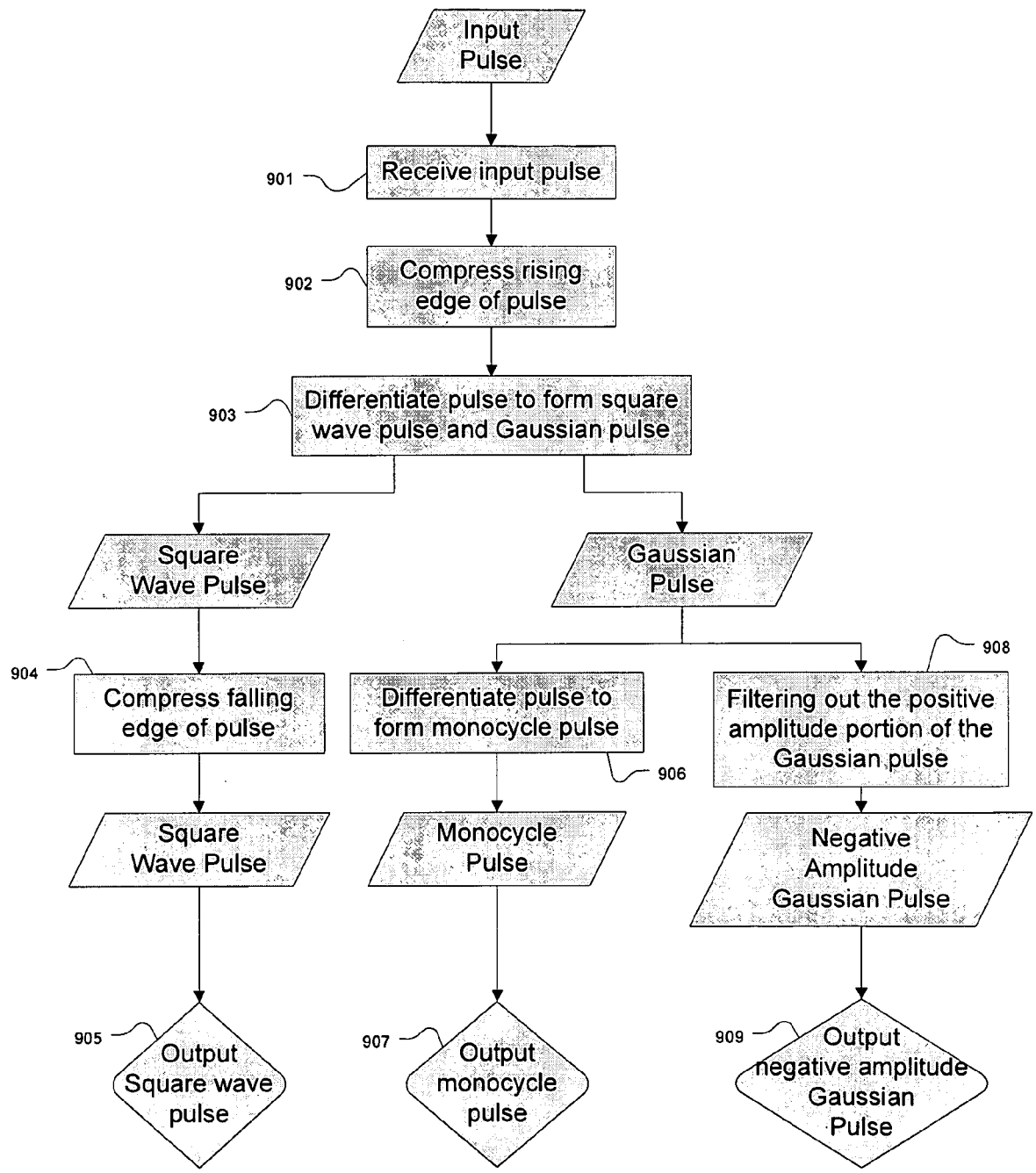
FIG. 10 is a flowchart of the method of simultaneously shaping sub-nanosecond pulses.

A flowchart of the method of simultaneously shaping UWB pulses is provided in FIG. 10. In operation 901, an input pulse is received. The input pulse is preferably a sinusoidal pulse. Then, in operation 902, the rising edge of the input pulse is compressed and, in operation 903, the input pulse is differentiated to form a square wave pulse and a Gaussian pulse. The falling edge of the square wave pulse is compressed, in operation 904, and then the square wave is outputted, in operation 905. The Gaussian pulse, created in operation 903, is then used to create a monocycle pulse and a negative amplitude Gaussian pulse. The Gaussian pulse is differentiated, in operation 906, to form a monocycle pulse, which is then outputted, in operation 907. The Gaussian pulse is also filtered to remove the positive amplitude portion of the Gaussian pulse to form a negative amplitude Gaussian pulse, in operation 908, which is then outputted, in operation 909.

It will be seen that the advantages set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall there between.

What is claimed is:

1. A pulse shaping circuit, comprising:
   circuitry for compressing a rising edge of an input pulse;
   a coupled-line differentiator connected to the rising edge compressing circuitry to differentiate the input pulse to form a square wave pulse, and a Gaussian pulse;
   circuitry for compressing the falling edge of the square wave pulse connected to the coupled-line differentiator; and
   a Schottky detector differentiator connected to the coupled-line differentiator to differentiate the Gaussian wave pulse to form a monocycle pulse.

2. A pulse shaping circuit, comprising:
   circuitry for compressing a rising edge of an input pulse;
   a coupled-line differentiator connected to the rising edge compressing circuitry to differentiate the input pulse to form a square wave pulse, and a Gaussian pulse;
   circuitry for compressing the falling edge of the square wave pulse connected to the coupled-line differentiator;
   a Schottky detector differentiator connected to the coupled-line differentiator to differentiate the Gaussian wave pulse to form a monocycle pulse; and
   a clamping and filter circuit connected to the coupled line differentiator to filter out the positive or negative portion of the Gaussian wave pulse.

3. The pulse shaping circuit of claim 1, wherein the input pulse is a sinusoidal pulse.

4. A method of simultaneously shaping pulses, comprising the steps of:
   receiving an input periodic waveform pulse;
   differentiating the input pulse to form a square wave pulse and a Gaussian pulse; and
   differentiating the Gaussian pulse to form a monocycle pulse.

5. The method of claim 4, further comprising the steps of:
   compressing a rising edge of the input pulse; and
   compressing a falling edge of the input pulse.

6. The method of claim 4, wherein the input pulse is a sinusoidal pulse.

7. A method of simultaneously shaping pulses, comprising the steps of:
   receiving an input periodic waveform pulse;
   differentiating the input pulse to form a square wave pulse and a Gaussian pulse;
   differentiating the Gaussian pulse to form a monocycle pulse;
   outputting the square wave pulse;
   selectively outputting the positive or negative amplitude portion of the Gaussian pulse; and
   outputting the monocycle pulse.

8. A method of simultaneously shaping pulses, comprising the steps of:
   receiving an input periodic waveform pulse;
   differentiating the input pulse to form a square wave pulse and a Gaussian pulse;
   differentiating the Gaussian pulse to form a monocycle pulse; and
   filtering out the positive amplitude portion of the Gaussian pulse.

* * * * *